(12) United States Patent
Ok et al.

(10) Patent No.: US 8,472,797 B2
(45) Date of Patent: Jun. 25, 2013

(54) IMAGE CAPTURING LENS SYSTEM

(75) Inventors: Hyun-wook Ok, Seoul (KR); Rozhkov Oleg Vladimirovich, Moscow (RU); Shirankov Alexandr Fedororvich, Moscow district (RU); Joo-young Kang, Yongin-si (KR); Seong-deok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 890 days.

(21) Appl. No.: 12/408,657

(22) Filed: Mar. 20, 2009

(65) Prior Publication Data
US 2009/0238552 A1 Sep. 24, 2009

(30) Foreign Application Priority Data
Mar. 24, 2008 (KR) ........................ 10-2008-0026860

(51) Int. Cl.
*G02B 7/28* (2006.01)
*G02B 15/14* (2006.01)
*G02B 17/00* (2006.01)
*G02B 9/08* (2006.01)
*H04N 5/225* (2006.01)

(52) U.S. Cl.
USPC ........... 396/111; 348/340; 359/691; 359/733; 359/738

(58) Field of Classification Search
USPC .................... 396/111; 348/340; 359/664, 735
See application file for complete search history.

(56) References Cited

U.S. PATENT DOCUMENTS

| | | | |
|---|---|---|---|
| 6,320,648 B1 * | 11/2001 | Brueck et al. | 355/67 |
| 2004/0263994 A1 * | 12/2004 | Sayag | 359/664 |
| 2007/0247725 A1 * | 10/2007 | Dowski et al. | 359/676 |

* cited by examiner

*Primary Examiner* — Rochelle-Ann J Blackman
(74) *Attorney, Agent, or Firm* — NSIP Law

(57) ABSTRACT

Disclosed is an image capturing lens system. The image capturing lens system includes an image capturing lens group having a plurality of lenses and a phase mask located in the image capturing lens group. The phase mask may satisfy phase mask functions that are defined with respect to x and y axes such that a modulation transfer function (MTF) of light is uniformized.

13 Claims, 4 Drawing Sheets

FIG.2

| Surf Type | Comment | Radius | Thickness | Glass | Diameter | Conic |
|---|---|---|---|---|---|---|
| OBJ STANDARD | | Infinity | 200 | | 131.092 | 0 |
| 1 EVENASPH | +8pow | 1.536499 | 1.033312 | -FPL51 | 2.76855 | -0.09540922 |
| 2 STANDARD | | 12.53391 | 0.1 | | 2.414362 | -0.0003516848 |
| 3 EVENASPH | | 2.572751 | 0.2 | POLYCARB | 1.945284 | -1.352054 |
| 4 EVENASPH | | 1.917497 | 0 | POLYCARB | 1.640051 | -4.133317 |
| 5 BINARY_2 | | 1.917497 | 0.1872133 | | 1.640051 | -4.133317 |
| STO STANDARD | | Infinity | 0 | | 1.602046 | 0 |
| 7 USERSURF | SODC_02 | Infinity | 0.2 | 330R | 1.613659 | 0 |
| 8 STANDARD | | Infinity | 0.7229564 | | 1.617607 | 0 |
| 9 EVENASPH | | -1.331381 | 0.9429718 | POLYCARB | 1.661329 | 0.8774411 |
| 10 EVENASPH | | -1.976054 | 0.02 | | 2.432324 | -1.029234 |
| 11 EVENASPH | | 5.736642 | 1.563224 | ACRYLIC | 2.769006 | 3.729272 |
| 12 EVENASPH | | 4.300620 | 0.9246703 | | 3.089852 | 0.008266434 |
| IMA STANDARD | | Infinity | | | 3.37111 | 0 |

FIG.3A

| |
|---|
| SURFACE DATA DETAIL: |
| Surface OBJ : STANDARD |
| Surface 1 : EVENASPH +8pow |
| Coeff on r 2 : 0 |
| Coeff on r 4 : 0.00058976302 |
| Coeff on r 6 : -5.4235834e-005 |
| Coeff on r 8 : 0 |
| Surface 2 : STANDARD |
| Surface 3 : EVENASPH |
| Coeff on r 2 : 0 |
| Coeff on r 4 : -0.028205387 |
| Coeff on r 6 : -0.0025904771 |
| Coeff on r 8 : -0.0034900072 |
| Coeff on r 10 : 0 |
| Surface 4 : EVENASPH |
| Coeff on r 2 : 0 |
| Coeff on r 4 : 0.066452197 |
| Coeff on r 6 : -0.13946953 |
| Coeff on r 8 : 0.25280027 |
| Coeff on r 10 : -0.19643043 |
| Coeff on r 12 : -0.085196469 |
| Coeff on r 14 : 0.12968379 |
| Coeff on r 16 : 0 |
| Surface 5 : BINARY_2 |
| Diffract Order : 1 |
| Coeff on r 2 : 0 |
| Coeff on r 4 : 0.066452197 |
| Coeff on r 6 : -0.13946953 |
| Coeff on r 8 : 0.25280027 |
| Coeff on r 10 : -0.19643043 |
| Coeff on r 12 : -0.085196469 |
| Coeff on r 14 : 0.12968379 |
| Coeff on r 16 : 0 |
| Maximum term : 2 |
| Maximum rad ap : 0.9 |
| Term on P to 2: -34.676651 |
| Term on P to 4: 1.6879704 |
| Surface STO : STANDARD |
| Surface 7 : USERSURF (SODC_02.DLL) SODC_02 ~0.01 ^2.5 |
| acx: 0.01 |
| apx: 2.5 |
| acy: 0.01 |
| apy: 2.5 |

FIG.3B

| |
|---|
| Surface 8 : STANDARD |
| Surface 9 : EVENASPH |
| Coeff on r 2 : 0 |
| Coeff on r 4 : -0.019386268 |
| Coeff on r 6 : 0.15942073 |
| Coeff on r 8 : -0.46257483 |
| Coeff on r 10 : 0.6212868 |
| Coeff on r 12 : -0.33892826 |
| Coeff on r 14 : 0 |
| Coeff on r 16 : 0 |
| Surface 10 : EVENASPH |
| Coeff on r 2 : 0 |
| Coeff on r 4 : 0.0063493897 |
| Coeff on r 6 : -0.0065492235 |
| Coeff on r 8 : -0.00037721482 |
| Coeff on r 10 : 0 |
| Surface 11 : EVENASPH |
| Coeff on r 2 : 0 |
| Coeff on r 4 : -0.0026558242 |
| Coeff on r 6 : -0.00036643155 |
| Coeff on r 8 : 0 |
| Surface 12 : EVENASPH |
| Coeff on r 2 : 0 |
| Coeff on r 4 : -0.038533213 |
| Coeff on r 6 : 0.0083328956 |
| Coeff on r 8 : -0.0016494476 |
| Coeff on r 10 : 0.00012203802 |
| Coeff on r 12 : 0 |
| Surface IMA : STANDARD |

IMAGE CAPTURING LENS SYSTEM

CROSS REFERENCE TO RELATED APPLICATIONS

This application claims the benefit under 35 U.S.C. §119(a) of Korean Patent Application No. 10-2008-26860, filed on Mar. 24, 2008, the disclosure of which is incorporated herein in its entirety by reference.

BACKGROUND

1. Field

The following description relates to an image capturing lens system, and more particularly, to an image capturing lens system to obtain an image in which both near and far objects are more clearly presented at the same time.

2. Description of the Related Art

In a fixed focus optical system, as an object is closer to a camera, degradation of point spread functions becomes more intensive, resulting in an unfocussed image. To address the focusing issue, an optical system enabling auto focusing has been introduced. In general, such an optical system moves a lens or an image sensor to auto-focus, and accordingly, uses a driving device. Consequently, the volume and weight of an optical device employing the auto-focusing optical system may be increased. Hence, there is a need for an apparatus and a method for obtaining an image of high quality in relation to a wide focal length by image processing.

SUMMARY

According to an aspect, there is provided an image capturing lens system which transfers light and uniformizes a modulation transfer function (MTF) of the transferred light.

According to another aspect, there is provided an image capturing lens system including an image capturing lens group having a plurality of lenses and a phase mask which is located in the image capturing lens group and satisfies phase mask functions that are defined with respect to x and y axes such that a modulation transfer function (MTF) of light is uniformized.

The MTF may be uniformized regardless of an incident length of the light, an incident angle of the light, and the wavelength of the light.

The phase mask functions may be $\Phi(x)=Ax(x/xmax)^{Bx}$ and $\Phi(y)=Ay(y/ymax)^{By}$, wherein 'x' represents an x-axis location of light passing through the phase mask, 'y' represents a y-axis location of light passing through the phase mask, 'xmax' represents an x-axis maximum location of the light passing through the phase mask and 'ymax' represents a y-axis maximum location the light passing through the phase mask.

Each of 'Ax' and 'Ay' may range from 0.007 to 0.012 mm, and each of 'Bx' and 'By' may range from 2.4 to 2.9 mm.

The image capturing lens group may be designed to have a shooting distance ranging from 0.18 m to infinity, a focal length (f) of 5 mm, a high aperture with a minimum f-number (f/#) of 2, and a field of view (FOV) of 46.5 deg (±23.25 deg).

The image capturing lens group may include a high-power lens, a first meniscus lens with a convex surface toward an object, a second meniscus lens with a convex surface toward an image, and a correction lens.

The image capturing lens system may further include a stop which is located in the image capturing lens group such that the lenses of the image capturing lens group are arranged symmetrical to one another with respect to a surface of the stop.

The MTF may be uniformized such that a captured image by projecting light though a lens is restored to the original image by use of the MTF.

Light passing through the phase mask may be divided into x-axis components and y-axis components so as to utilize a one-dimensional signal processing in a post-processing of an image.

According to still another aspect, there is provided an optical image capturing device employing an image capturing lens system, the image capturing lens system including an image capturing lens group having a plurality of lenses and a phase mask which is located in the image capturing lens group and satisfies phase mask functions that are defined with respect to x and y axes such that a modulation transfer function (MTF) of light is uniformized.

Other features and aspects will be apparent from the following detailed description, the drawings, and the claims.

BRIEF DESCRIPTION OF THE DRAWINGS

FIG. 2 is a table showing specifications of the image capturing lens system of FIG. 1.

FIGS. 3A and 3B are tables showing detailed data of the image capturing lens system of FIG. 1.

Figure 1:
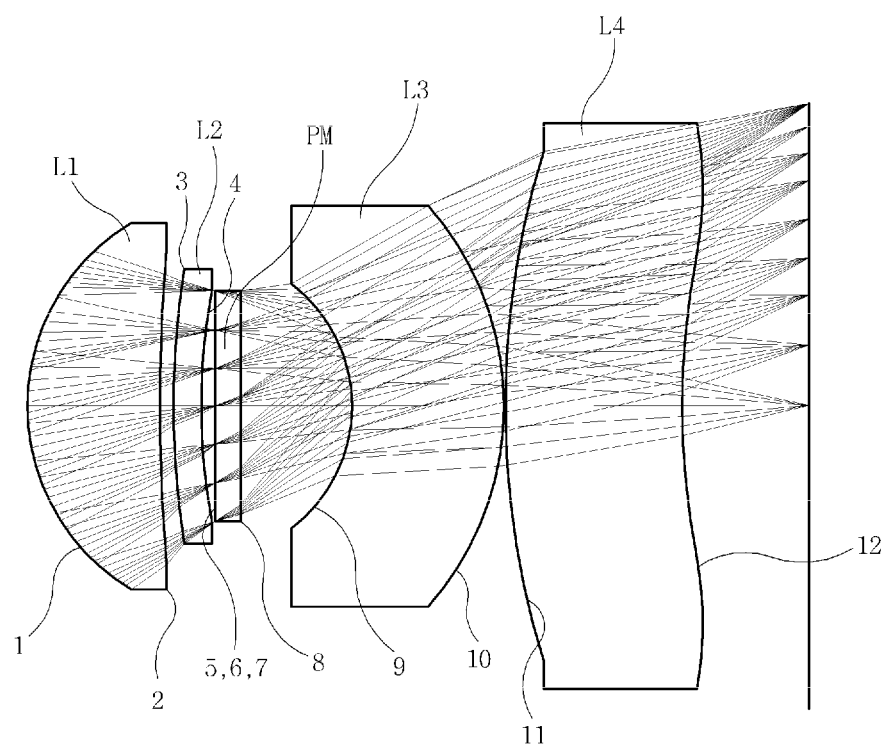
FIG. 1 is a diagram illustrating an exemplary image capturing lens system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

An image capturing lens system according to an exemplary embodiment includes a phase mask to unformize a modulation transfer function (MTF) regardless of an incident length, an incident angle and the wavelength of light. MTF may indicate how much a resulting image represents the original image by comparing a resulting definition chart obtained by projecting light through a lens with an original definition chart of the image. Where the MTF is uniformized regardless of an incident length, an incident angle and the wavelength of light, the captured image by projecting light through a lens may be restored to the original image by use of the MTF, and consequently, post-processing with respect the resulting image may be simplified.

FIG. 1 illustrates an exemplary image capturing lens system. Referring to FIG. 1, the image capturing lens system includes an image capturing lens group comprising a plurality of lenses L1, L2, L3, and L4, and a phase mask (PM) placed in the lens group.

The image capturing lens group may include four lenses including a high-power lens L1, a first meniscus lens L2 with a convex surface toward an object, a second meniscus lens L3 with a convex surface toward an image, and a correction lens L4.

The high-power lens L1 collects light rays from the object, and the first meniscus lens L2 functions as a low-powered negative corrector to reduce spherical aberration. The correction lens L4 is aspheric, which enables reduction of field aberration.

The four lenses L1, L2, L3, and L4 may be designed to form a high-quality image at a midpoint of an operating shooting distance of light. Accordingly, the image capturing lens group, without the phase mask PM, may be designed to minimize the wave aberration at the midpoint of the operating shooting distance and generate a higher-quality image.

For example, the image capturing lenses L1, L2, L3, and L4 are designed to have a uniform MTF, a focal length (f) of 5 mm, a high aperture with a minimum f-number (f/#) of 2, and a field of view (FOV) of 46.5 deg (±23.25 deg) where the shooting distance ranges between 0.18 m and infinity. The "deg" may refer to a distance between the center of a lens and a ray of light. For example, 0 deg indicates a light ray passing through the center of the lens, and 23.5 deg indicates a light ray passing through the edge of the lens.

The phase mask (PM) may be designed to satisfy phase mask functions defined with respect to an x-axis and a y-axis such that uniformization of the MTF may be realized regardless of an incident length, an incident angle and the wavelength of the light.

For example, the phase mask functions may be represented by the following Equation 1 and Equation 2.

$$\Phi(x)=Ax(x/x\max)^{Bx} \quad \text{[Equation 1]}$$

Here, 'x' represents an x-axis location of light passing through the phase mask (PM), and 'xmax' represents an x-axis maximum location of the light passing through the phase mask (PM). In addition, an 'Ax' represents the amplitude of the function, and a 'Bx' indicates the power of the function.

$$\Phi(y)=Ay(y/y\max)^{By} \quad \text{[Equation 2]}$$

Here, 'y' represents a y-axis location of light passing through the phase mask (PM), and 'ymax' represents a y-axis maximum location the light passing through the phase mask (PM). Moreover, 'Ay' represents the amplitude of the function, and 'By' indicates the power of the function.

The 'Ax' and the 'Ay' may be similar values, for example, ranging from 0.007 to 0.012 mm, and the 'Bx' and the 'By' may also be similar values, for example, ranging from 2.4 to 2.9 mm. Thus, an image capturing lens system according to an exemplary embodiment may be optimized such that the MTF is uniformized where the 'Ay' is 0.010 mm with an error of plus or minus approximately 0.002 mm and the 'By' is 2.7 mm with an error of plus or minus approximately 0.2 mm.

Although not illustrated in FIG. 1, a stop may be further included in the image capturing lens group. The stop may be located such that the lenses in the lens group are symmetrical to one another with respect to a surface of the stop. For example, the stop may be located in the image capturing lens group, not between an object and the lens, so as to reduce aberration.

FIG. 2 shows a table with specifications of the image capturing lens system of FIG. 1 and information of each surface of lenses identified in FIG. 1.

In FIG. 2, 'OBJ STANDARD' represents an object to be captured. 'STANDARD' indicates a spherical surface of a lens, 'EVENASPII' indicates an aspheric surface of a lens, and 'BINARY 2' indicates a surface to identify diffraction. Remarks are provided in a 'Comment' column, a 'Radius' column shows a curvature of each surface, and 'Thickness' indicates a distance from one surface to the opposite surface. 'Glass' indicates a material of a lens. 'Diameter' indicates a size of each surface, and 'Conic' indicates a constant for representing a shape of each surface.

In consideration of surfaces with a thickness of 0, information of surfaces in FIG. 2 corresponds to the surfaces of the lens in the image capturing lens system of FIG. 1.

For example, the high-power lens L1 is 1.536499 mm in radius, 1.033312 mm in thickness, 2.76855 mm in diameter, and made of FPL-51, and has a conic constant of −0.09540922.

FIGS. 3A and 3B show detailed data of the image capturing lens system of FIG. 1. FIGS. 3A and 3B show polynomial aspheric coefficients that define the contour of each surface. Only aspheric surfaces may have the polynomial aspheric coefficients. In addition, the polynomial aspheric coefficients are even-numbered since the polynomial aspheric surfaces are rotatory symmetrical.

For example, in a surface 1 of a first lens, 'coeff on r2' is 0, 'coeff on r4' is 0.000058976302, 'coeff on r6' is −5.4235834e-005, and 'coeff on r8' is 0.

In a surface 5, 'Binary 2' indicates a spherical surface that identifies diffraction as described above, and there are polynomial aspheric coefficients and additional data showing variation of the diffraction and including 'maximum term', 'maximum rad ap', 'Term on P to 2', and 'Term on P to 4'.

In a surface 7, each of '(SODC_02.DLL) SODC_ 02~0.01^2.5', 'acx', 'apx', 'acy', and 'apy' indicates a function of a phase mask, the 'acx' corresponds to the above-described 'Ax', the 'acy' corresponds to the above-described 'Ay', the 'apx' corresponds to 'Bx', and the 'apy' corresponds to 'By'. In the table of FIG. 3A, the 'Ax' and the 'Ay' are 0.01 mm, and the 'Bx' and the 'By' are 2.5 mm.

According to an exemplary embodiment, an image signal with a uniform MTF may be achieved regardless of a shooting distance of a light source, an incident angle and the wavelength of the light. Therefore, post-processing may be simplified by, for example, only applying the uniform MTF to an image.

In addition, according to an exemplary embodiment, a phase mask is located between lenses, so that aberration correction may be easily performed. Moreover, since light that has passed through the phase mask is divided into x-axis components and y-axis components, one-dimensional signal processing is available in post-processing. Accordingly, complexity of post-processing may be reduced by performing the one-dimensional signal processing twice, instead of two-dimensional signal processing.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image capturing lens system comprising:
an image capturing lens group comprising a plurality of lenses including a first lens and a second lens; and
a phase mask which is located in the image capturing lens group and satisfies phase mask functions that are defined with respect to x and y axes such that a modulation transfer function (MTF) of light is uniformized, wherein the phase mask is disposed between the first and second lenses; and the first lens is a meniscus lens.

2. The image capturing lens system of claim 1, wherein the MTF is uniformized regardless of an incident length of the light, an incident angle of the light, and a wavelength of the light.

3. The image capturing lens system of claim 1, wherein the phase mask functions are $\Phi(x)=Ax(x/xmax)Bx$ and $\Phi(y)=Ay(y/ymax)By$, 'x' represents an x-axis location of light passing through the phase mask, 'y' represents a y-axis location of light passing through the phase mask, 'xmax' represents an x-axis maximum location of the light passing through the phase mask and 'ymax' represents a y-axis maximum location the light passing through the phase mask.

4. The image capturing lens system of claim 1, further comprising:

a stop which is located in the image capturing lens group such that the lenses of the image capturing lens group are arranged symmetrical to one another with respect to a surface of the stop.

5. The image capturing lens system of claim 1, wherein the MTF is uniformized such that a captured image by projecting light through a lens is restored to the original image by use of the MTF.

6. The image capturing lens system of claim 1, wherein light passing through the phase mask is divided into x-axis components and y-axis components so as to utilize a one-dimensional signal processing in a post-processing of an image.

7. An optical image capturing device employing the image capturing lens system of claim 1.

8. The image capturing lens system of claim 1, further comprising a high power lens, wherein the high power lens, the first meniscus lens, the phase mask, and the second lens are arranged in that order.

9. The image capturing lens system of claim 8, wherein the high power lens is a positive plano-convex lens with a convex surface toward an object, and the first meniscus lens has a convex surface toward the object.

10. An image capturing lens system comprising:

an image capturing lens group comprising a plurality of lenses including a first meniscus lens and a second lens; and a phase mask which is located in the image capturing lens group between the first meniscus lens and a second lens, and satisfies phase mask functions that are defined with respect to x and y axes such that a modulation transfer function (MTF) of light is uniformized, wherein the phase mask functions are $\Phi(x)=Ax(x/xmax)Bx$ and $\Phi(y)=Ay(y/ymax)By$, 'x' represents an x-axis location of light passing through the phase mask, 'y' represents a y-axis location of light passing through the phase mask, 'xmax' represents an x-axis maximum location of the light passing through the phase mask and 'ymax' represents a y-axis maximum location the light passing through the phase mask, and wherein each of 'Ax' and 'Ay' ranges from 0.007 to 0.012 mm, and each of 'Bx' and 'By' ranges from 2.4 to 2.9 mm.

11. An image capturing lens system comprising:

an image capturing lens group comprising a plurality of lenses; and a phase mask which is located in the image capturing lens group and satisfies phase mask functions that are defined with respect to x and y axes such that a modulation transfer function (MTF) of light is uniformized, wherein the image capturing lens group is designed to have a shooting distance ranging from 0.18 m to infinity, a focal length (f) of 5 mm, a high aperture with a minimum f-number (f/#) of 2, and a field of view (FOV) of 46.5 deg (±23.25 deg).

12. An image capturing lens system comprising:

an image capturing lens group comprising a plurality of lenses; and a phase mask which is located in the image capturing lens group and satisfies phase mask functions that are defined with respect to x and y axes such that a modulation transfer function (MTF) of light is uniformized, wherein the image capturing lens group comprises a high-power lens, a first meniscus lens with a convex surface toward an object, a second meniscus lens with a convex surface toward an image, and a correction lens.

13. The image capturing lens system of claim 12, wherein the second meniscus lens has a convex surface with a curvature that is greater than a curvature of a convex surface of the first meniscus lens.

* * * * *